United States Patent
Alon et al.

(10) Patent No.: US 7,394,845 B2
(45) Date of Patent: Jul. 1, 2008

(54) METHOD FOR INTERWOVEN SPREADING CODES

(75) Inventors: Dani Alon, Hod-Hasharon (IL); Meir Gazit, Ashkelon (IL)

(73) Assignee: Vishay Intertechnology, Inc., Malvern, PA (US)

( * ) Notice: Subject to any disclaimer, the term of this patent is extended or adjusted under 35 U.S.C. 154(b) by 533 days.

(21) Appl. No.: 11/050,077

(22) Filed: Feb. 3, 2005

(65) Prior Publication Data

US 2006/0171447 A1 Aug. 3, 2006

(51) Int. Cl.
*H04B 1/00* (2006.01)
*H03M 7/00* (2006.01)

(52) U.S. Cl. .......................... 375/146; 341/81
(58) Field of Classification Search ......... 375/130–153; 341/173, 81, 50, 51
See application file for complete search history.

(56) References Cited

U.S. PATENT DOCUMENTS

| | | | | |
|---|---|---|---|---|
| 4,153,900 A | * | 5/1979 | Novak et al. ................ | 342/201 |
| 4,568,915 A | | 2/1986 | Gutleber | |
| 4,943,976 A | * | 7/1990 | Ishigaki ...................... | 375/142 |
| 5,077,753 A | | 12/1991 | Grau, Jr. et al. | |
| 5,157,689 A | * | 10/1992 | Kurihara ..................... | 375/130 |
| 5,786,788 A | * | 7/1998 | Schober et al. ............. | 342/159 |
| 6,134,264 A | | 10/2000 | Shiba et al. | |
| 6,385,187 B1 | | 5/2002 | Ahn et al. | |
| 6,535,545 B1 | | 3/2003 | Ben-Bassat et al. | |
| 2003/0174792 A1 | * | 9/2003 | Bow et al. .................... | 375/343 |

* cited by examiner

*Primary Examiner*—Mohammed Ghayour
*Assistant Examiner*—Vineeta Panwalkar
(74) *Attorney, Agent, or Firm*—McKee, Voorhees & Sease, P.L.C.

(57) ABSTRACT

An interwoven spreading code is formed by a stretched spreading code series at a first frequency and a mirror of the stretched spreading code series at a second frequency. The interwoven spreading code can be used to spread a baseband signal. Data can be recovered through correlation of a received signal with the interwoven spreading code. The spreading code used in forming the interwoven spreading code can be a Barker code.

7 Claims, 4 Drawing Sheets

| Barker 13 series | 1 | 1 | 1 | 1 | -1 | -1 | 1 | 1 | -1 | 1 | -1 | 1 |
|---|---|---|---|---|---|---|---|---|---|---|---|---|
| Mirrored Barker 13 series: | 1 | -1 | 1 | -1 | 1 | 1 | -1 | -1 | 1 | 1 | 1 | 1 |
| sum: | 2 | 0 | 2 | 0 | 2 | 0 | -2 | 0 | 2 | 0 | 2 | 0 | 2 |

| Streched Barker 13 series | 0.5 | 1 | 1 | 1 | 1 | 0 | -1 | 0 | 1 | 0 | 0 | 0 | 0 | 0.5 |
|---|---|---|---|---|---|---|---|---|---|---|---|---|---|---|
| mirrored streched Barker 13 series: | 0.5 | 0 | 0 | 0 | 0 | 1 | 0 | -1 | 0 | 1 | 1 | 1 | 1 | 0.5 |
| sum: | 1 | 1 | 1 | 1 | 1 | 1 | -1 | -1 | 1 | 1 | 1 | 1 | 1 |

| Streched Barker 13 series | 0.5 | 1 | 1 | 1 | 1 | 0 | -1 | 0 | 1 | 0 | 0 | 0 | 0 | 0.5 |
|---|---|---|---|---|---|---|---|---|---|---|---|---|---|---|
| Reversed streched Barker 13 series: | *0.5* | *0* | *0* | *0* | *0* | *1* | *0* | *-1* | *0* | *1* | *1* | *1* | *1* | *0.5* |
| The novel interwoven series: | 0.5+*0.5* | 1 | 1 | 1 | 1 | *1* | -1 | -1 | 1 | *1* | *1* | *1* | *1* | 0.5+*0.5* |

| Barker 13 series | 1 | 1 | 1 | 1 | 1 | -1 | -1 | 1 | 1 | -1 | 1 | -1 | 1 |
|---|---|---|---|---|---|---|---|---|---|---|---|---|---|
| Mirrored Barker 13 series: | 1 | -1 | 1 | -1 | 1 | 1 | -1 | -1 | 1 | 1 | 1 | 1 | 1 |
| sum: | 2 | 0 | 2 | 0 | 2 | 0 | -2 | 0 | 2 | 0 | 2 | 0 | 2 |

| Streched Barker 13 series | 0.5 | 1 | 1 | 1 | 1 | 0 | -1 | 0 | 1 | 0 | 0 | 0 | 0 | 0.5 |
|---|---|---|---|---|---|---|---|---|---|---|---|---|---|---|
| mirrored streched Barker 13 series: | 0.5 | 0 | 0 | 0 | 0 | 1 | 0 | -1 | 0 | 1 | 1 | 1 | 1 | 0.5 |
| sum: | 1 | 1 | 1 | 1 | 1 | 1 | -1 | -1 | 1 | 1 | 1 | 1 | 1 | 1 |

| Streched Barker 13 series | 0.5 | 1 | 1 | 1 | 1 | 0 | -1 | 0 | 1 | 0 | 0 | 0 | 0 | 0.5 |
|---|---|---|---|---|---|---|---|---|---|---|---|---|---|---|
| Reversed streched Barker 13 series: | 0.5 | 0 | 0 | 0 | 0 | 1 | 0 | -1 | 0 | 1 | 1 | 1 | 1 | 0.5 |
| The novel interwoven series: | 0.5+0.5 | 1 | 1 | 1 | 1 | 1 | -1 | -1 | 1 | 1 | 1 | 1 | 1 | 0.5+0.5 |

Figure 8

METHOD FOR INTERWOVEN SPREADING CODES

BACKGROUND OF THE INVENTION

The present invention relates to interwoven spreading codes such as Barker codes which are used in pulse compression or pulse encoding, such as may be used in direct sequence spread spectrum communications. Although the present invention is discussed primarily in the context of direct sequence spread spectrum signals, the present invention is not to be limited to this specific context as Barker codes and other spreading codes can be used in other contexts, especially in applications relating to high noise low signal environments.

In a spread spectrum system a signal occupies a higher bandwidth than the minimum necessary for transmission of information. The baseband is spread through using a code that is independent of the data to be sent. Direct sequence is one type of technique where the data signal is multiplied by a code signal. The code can be a Barker code. At the receiver, the original data signal is recovered by correlation of the received signal with a synchronized replica of the coding signal used to spread the baseband. Thus Barker codes can be used for spreading.

Barker codes can be defined as a sequence of length N for which the aperiodic autocorrelation function is less than or equal to 1/N away from 0. Barker codes can exist for binary or non-binary codes. Binary Barker codes have been found for lengths of 2, 3, 4, 5, 7, 11, and 13. A Barker code is a series of digits $a_i = \pm 1$ of length $N \geq 2$ such that $$\left| \sum_{i=1}^{N-k} a_i a_{i+k} \right| \leq 1 \text{ for all } 1 \leq k < N$$

Barker codes are used in pulse compression, or pulse coding. Barker codes can be used to compare two signals resulting in a maximum output if the two signals match and either a zero or a constant minimum value in other cases. This comparison process is generally called correlation. One bit of each input line is examined at a time, these bits are multiplied and the individual results are added. Barker codes are not the only type of code that is used for spreading, as other spreading codes are used.

Despite these advantages, problems remain. One of the most significant problems with using Barker codes is the uneven envelope of the pulses when a limited bandwidth is required. This uneven envelope allows less energy per pulse to be transmitted, thus reducing the sensitivity of the receiver.

Therefore, it is a primary object, feature, or advantage of the present invention to improve upon the state of the art.

Another object, feature, or advantage of the present invention is to provide a code that provides for increased uniformity in amplitude and thus a more even envelope when a limited bandwidth is required.

Yet another object, feature, or advantage of the present invention is to provide a code that provides for increased energy per pulse to be generated.

A further object, feature, or advantage of the present invention is to provide a code that provides substantially the same autocorrelation properties as those associated with a Barker code.

One or more of these and/or other objects, features, or advantages of the present invention will become apparent from the specification and claims that follow.

SUMMARY OF THE INVENTION

The present invention provides for the creation of and use of interwoven spreading codes. According to one aspect of the present invention, a method of communication involves combining an interwoven spreading code, such as a Barker code with digital data to produce a signal and then sending the signal. The interwoven spreading code is formed from a stretched spreading code series at a first frequency and a mirror of the stretched spreading code series at a second frequency. According to another aspect of the present invention digital data is extracted from a signal that contains data encoded through use of interwoven spreading codes. Preferably, the spreading code used is a Barker code, however other spreading codes with suitable auto correlation properties can also be used.

BRIEF DESCRIPTION OF THE DRAWINGS

FIG. 8 illustrates one embodiment of deriving interwoven Barker codes of the present invention.

DETAILED DESCRIPTION OF THE PREFERRED EMBODIMENT

The present invention provides for use of interwoven spreading codes and methods of using these codes in communication systems. The present invention is not to be limited to the specific embodiments described herein. For purposes of explanation, a Barker code is used. The present invention contemplates, however, that other types of spreading codes can be used, especially those that provide desirable auto correlation properties.

By studying the relationship between a Barker series and its mirror image, the present inventors have observed that the two series alternately build each other and destroy each other. For purposes of explanation, a Barker 13 series is used, although any Barker series can be used.

| Barker 13 series | 1 | 1 | 1 | 1 | 1 | −1 | −1 | 1 | 1 | −1 | 1 | −1 | 1 |
|---|---|---|---|---|---|---|---|---|---|---|---|---|---|
| Mirrored Barker 13 series: | 1 | −1 | 1 | −1 | 1 | 1 | −1 | −1 | 1 | 1 | 1 | 1 | 1 |
| sum: | 2 | 0 | 2 | 0 | 2 | 0 | −2 | 0 | 2 | 0 | 2 | 0 | 2 |

The sum of the two series emphasizes this fact as for each digit either alternating twos or zeros result. The alternating twos indicate build-up while the zeros indicate destruction.

By creating a new series in which each element is the average of two consecutive elements in the Barker 13 series, we can negate this alternating pattern.

Figure 2:
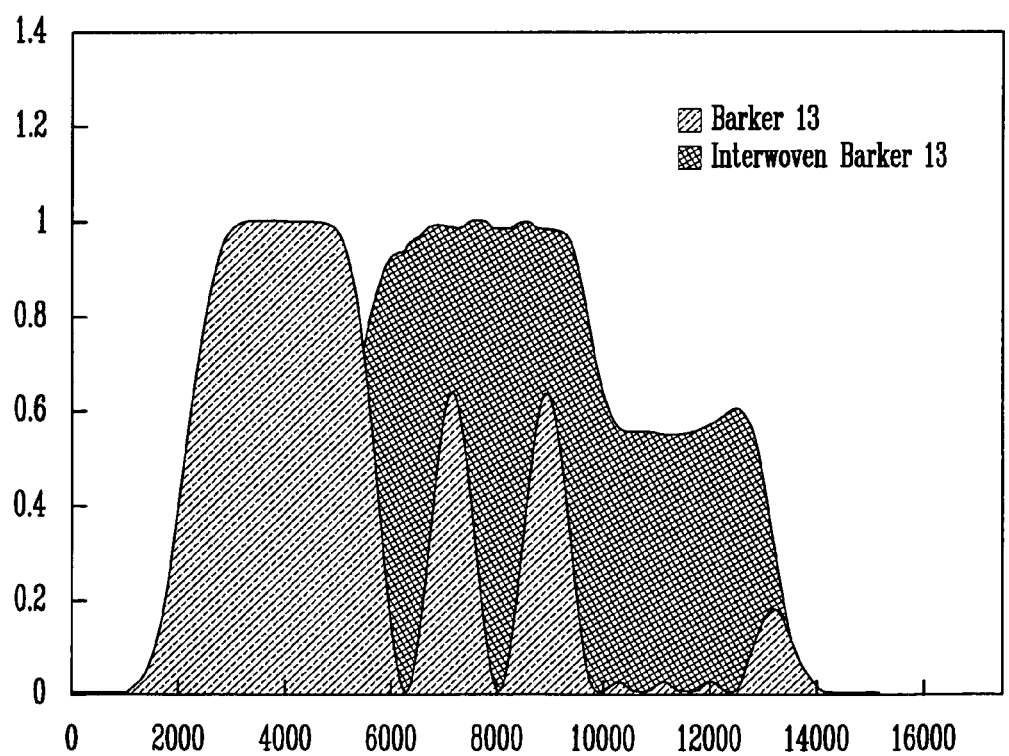
FIG. 2 is a graph illustrating a comparison between a simulated Barker 13 and an Interwoven Barker 13 transmitted signal and the differences in uniformity of the amplitude.

FIG. 2 illustrates one of the useful advantages of the Interwoven Barker Code. In particular, FIG. 2 illustrates that the Interwoven Barker Code provides a more uniform amplitude than a Barker 13 series. The uniform amplitude of the Interwoven Barker code allows more energy per pulse to be generated.

| Stretched Barker 13 series | 0.5 | 1 | 1 | 1 | 1 | 0 | −1 | 0 | 1 | 0 | 0 | 0 | 0 | 0.5 |
|---|---|---|---|---|---|---|---|---|---|---|---|---|---|---|
| mirrored stretched Barker 13 series: | 0.5 | 0 | 0 | 0 | 0 | 1 | 0 | −1 | 0 | 1 | 1 | 1 | 1 | 0.5 |
| sum: | 1 | 1 | 1 | 1 | 1 | 1 | −1 | −1 | 1 | 1 | 1 | 1 | 1 | |

The resulting two vectors are indifferent to each other; when the stretched Barker 13 gives a one, its mirror returns a zero and vice versa. The sum vector emphasizes this characteristic. In addition, the envelope of the series is almost uniform. This allows more energy per pulse to be transmitted.

In mathematical terms, the new series is created, by convolution of the Barker 13 series with the vector [0.5,0.5]. This mathematical operation guarantees that the autocorrelation obtained by these series will not be significantly altered. In addition, the bandwidth of the signal will be narrowed as its duration increases.

Since the two series are mirror images of each other, symmetry demands that both series generate autocorrelation at the exact same point in time. By centering each series on a different frequency and intertwining them, we obtain a signal with uniform amplitude and well-defined autocorrelation.

Figure 3:
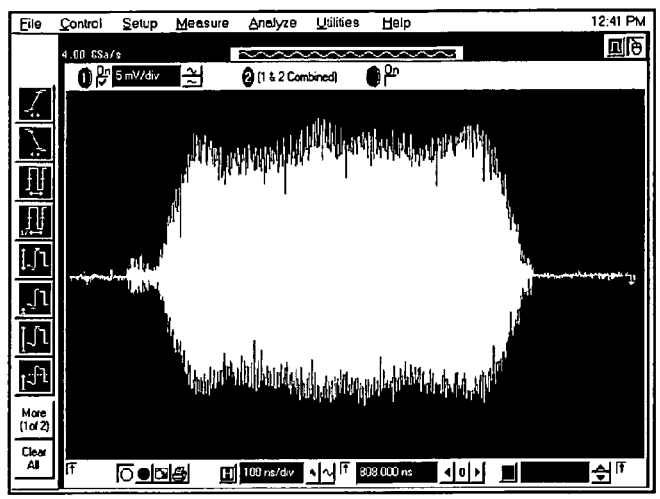
FIG. 3 illustrates the measured transmitted signal of an Interwoven Barker 13 code showing a uniform envelope.
Figure 4:
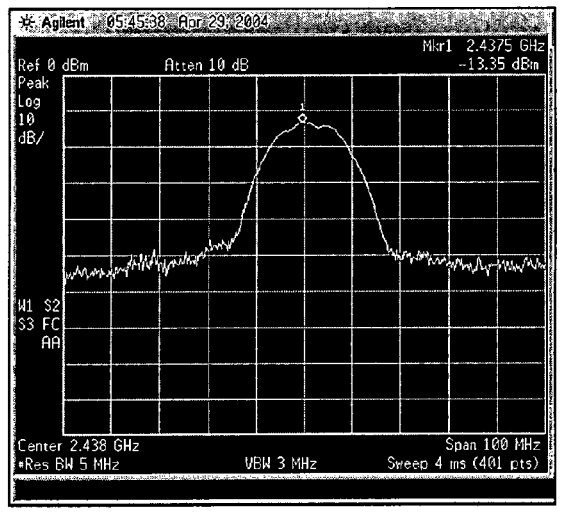
FIG. 4 illustrates the power spectrum of the Interwoven Barker 13 code.

The Interwoven Barker codes, including the Interwoven Barker 13 code can be implemented using SAW (surface acoustic wave) technology, such as that disclosed in U.S. Pat. No. 6,535,545, herein incorporated by reference in its entirety. In one embodiment of the present invention each of the two interwoven series can be encoded using BPSK (bi-phase sequence keying) at a separate frequency. For example the first series can be set at 482 MHz and the second series can be set at 494 MHz. The resulting signal was transmitted and observed on an oscilloscope. The PA (pulse amplitude) compression envelope was observed to become more uniform than predicted by simulation. This is illustrated in FIG. 3. The spectrum of the resulting Interwoven Barker 13 code was also observed in FIG. 4. Note that the center frequency is set at 2.438 GHz and the signal has a relatively limited bandwidth.

| Stretched Barker 13 series | 0.5 | 1 | 1 | 1 | 1 | 0 | −1 | 0 | 1 | 0 | 0 | 0 | 0 | 0.5 |
|---|---|---|---|---|---|---|---|---|---|---|---|---|---|---|
| Reversed stretched Barker 13 series: | 0.5 | 0 | 0 | 0 | 0 | 1 | 0 | −1 | 0 | 1 | 1 | 1 | 1 | 0.5 |
| The novel interwoven series: | 0.5 + 0.5 | 1 | 1 | 1 | 1 | 1 | −1 | −1 | 1 | 1 | 1 | 1 | 1 | 0.5 + 0.5 |

The bold numbers originate from the stretched Barker 13 series, and are represented by one frequency. The italic elements are derived from the reversed series and are represented by a second frequency. The sum of these two series is the code which herein is called an "Interwoven Barker Code." There is an Interwoven Barker Code that can be constructed from each Barker code in the manner previously disclosed. For convenience, FIG. 8 also illustrates how an Interwoven Barker Code can be determined from a Barker series.

Figure 1:
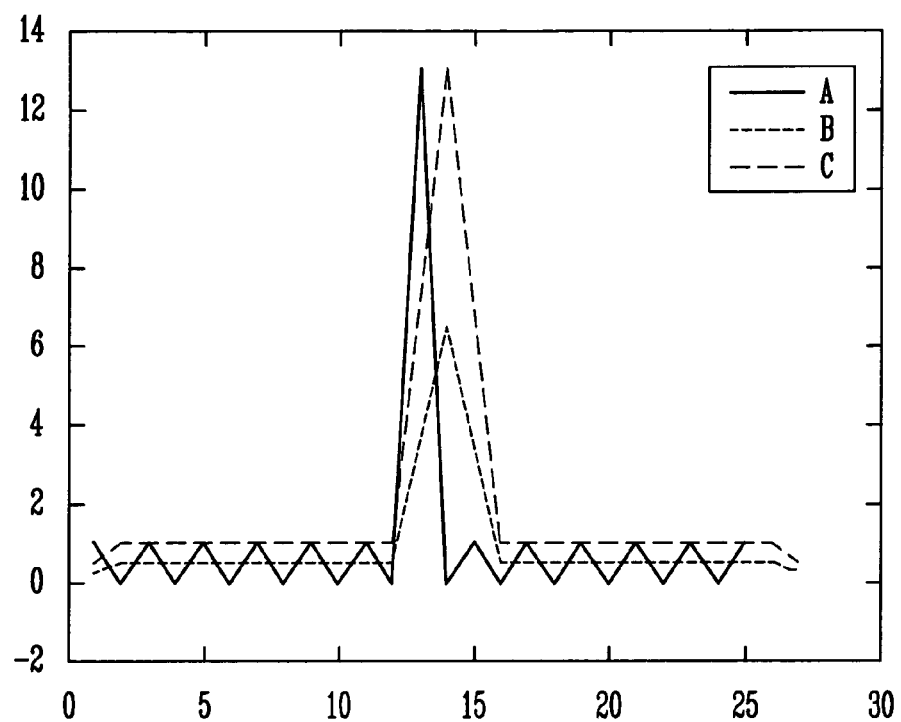
FIG. 1 is a graph illustrating autocorrelation of a Barker 13 series, a stretched Barker 13 series or its mirror, and autocorrelation of the sum of a stretched series with its mirror (interwoven Barker series).

FIGS. 1 and 2 illustrate some of the useful properties of Interwoven Barker codes. In FIG. 1, the autocorrelation of a Barker 13 series is indicated by series A. The autocorrelation of a stretched Barker 13 series or its mirror is indicated by series B. The autocorrelation of the sum of the stretched Barker 13 series with its mirror (the Interwoven Barker 13 series) is indicated by series C. Note that the autocorrelation of the Interwoven Barker 13 series C is substantially the same as for the Barker 13 series A, thus this advantage of Barker series is maintained.

Figure 5:
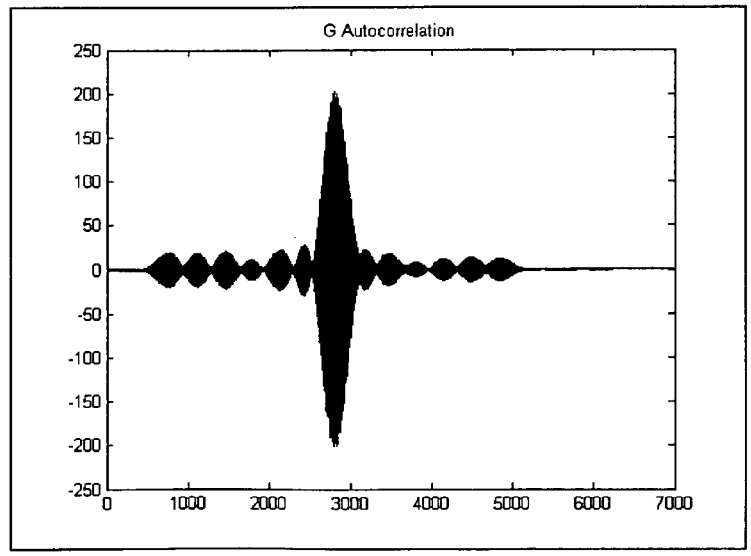
FIG. 5 illustrates the autocorrelation signal of the Interwoven Barker 13 code as measured.

FIG. 5 illustrates the autocorrelation signal of the Interwoven Barker 13 code which is consistent with the simulated autocorrelation signal.

Figure 6:
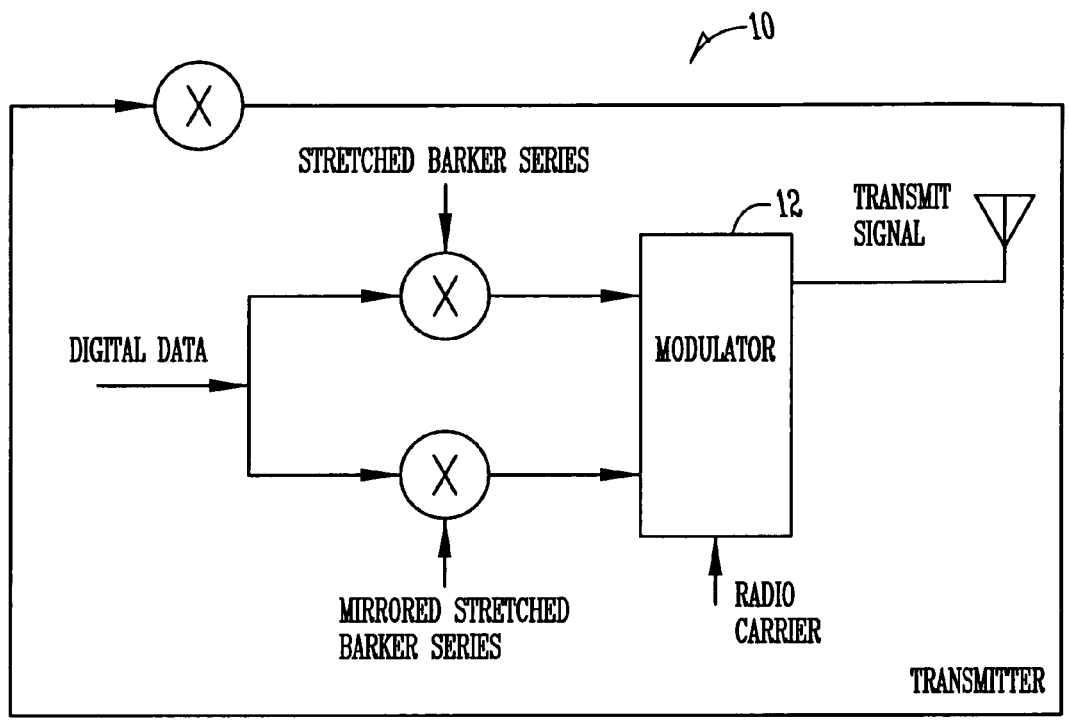
FIG. 6 illustrates one embodiment of a transmitter adapted for use of Interwoven Barker codes.
Figure 7:
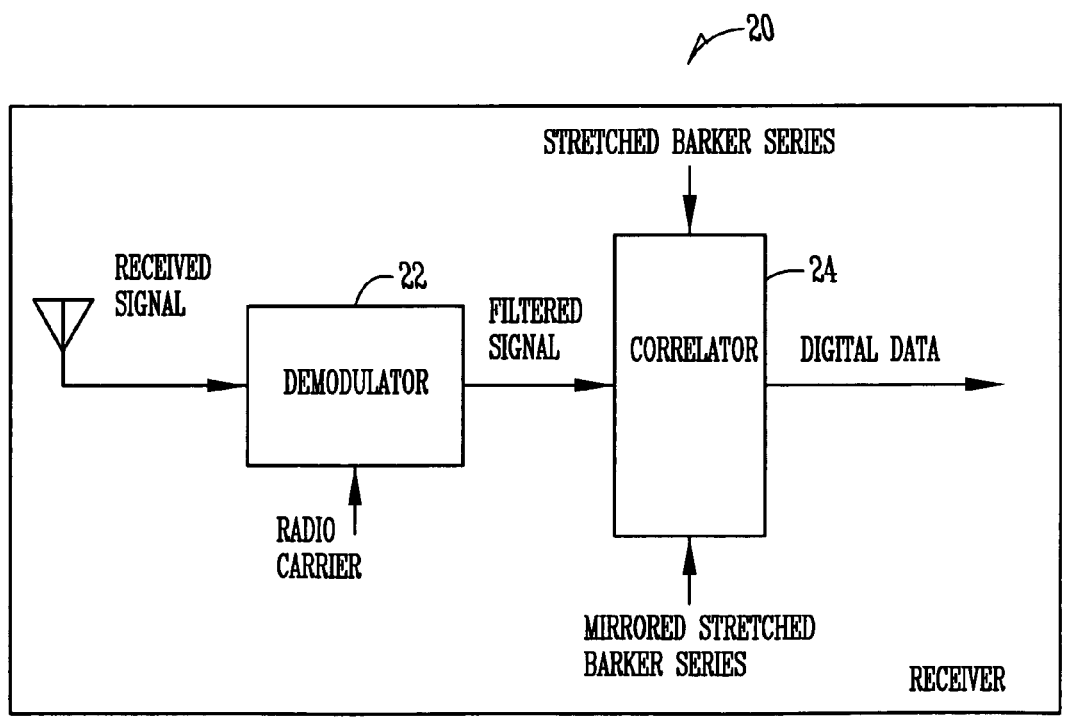
FIG. 7 illustrates one embodiment of a receiver adapted for use of Interwoven Barker codes.

The present invention provides for using Interwoven Barker codes in any number of applications, including in applications where Barker codes are presently used and where it would be advantageous to have a more uniform amplitude and a limited bandwidth. FIG. 6 illustrates a block diagram of one embodiment of a transmitter using an Interwoven Barker Code. As shown in FIG. 6. Incoming digital data bits are combined (such as through use of an XOR function) with a stretched Barker series and a mirrored stretched Barker series. The resulting signal is modulated by a modulator 12 to produce a signal for transmission. In FIG. 7, a receiver 20 is shown. A received signal is input to a demodulator 22. After filtering the resulting signal is sent to a correlator 24 that uses the stretched Barker series and a mirrored stretched Barker series to provide for determining the digital data. One skilled in the art having the benefit of this disclosure that Interwoven Barker codes of the present invention can be used in any number of hardware and/or software implementations of devices.

Although specific embodiments have been described herein, the present invention contemplations numerous other embodiments and variations. For example, the present invention provides for using spreading codes of various types, including Barker codes or other spreading codes recognized as providing effective auto correlation signals, when summed with their mirror image. The present invention contemplates interwoven spreading codes of different lengths, the present invention contemplates using interwoven spreading codes in applications other than spread spectrum digital communications, differences in the type of modulation used, the frequencies used, and other differences and variations which would be apparent to one skilled in the art having the benefit of this disclosure. These and other variations are all within the spirit and scope of the invention.

What is claimed is:

1. A method of communication, comprising:
    providing a spreading code A consisting of elements 1 . . . n;
    obtaining a stretch code B, having an element i being an average of element (i-1) and element i of code A;
    obtaining a code C by mirroring code B to thereby reverse positions of elements of B;
    obtaining an interwoven code D by summing codes B and C; and
    spreading data using the interwoven code to produce a signal transmitting the signal to a receiver.

2. The method of claim 1 wherein the interwoven spreading code is formed from code B at a first frequency and code C at a second frequency.

3. The method of claim 1 further comprising transmitting the signal.

4. The method of claim 1 further comprising receiving the signal.

5. The method of claim 4 further comprising detecting correlation peaks in the signal to extract the digital data.

6. A system for extracting digital data from a signal encoded by interwoven spreading codes, comprising:
    a demodulator for providing a demodulated signal;
    a correlator operatively connected to the demodulator and adapted for correlating an interwoven code to the demodulated signal;
    wherein the interwoven code is obtained by providing a spreading code A consisting of elements 1 . . . n, obtaining a stretched code B having element i being an average of element (i-1) and element i of code A, obtaining a code C by mirroring code B to thereby reverse position of elements of B, and summing codes B and C to obtain the interwoven code.

7. The system of claim 6 wherein the spreading code is a Barker code.

* * * * *